United States Patent [19]

Bicskei

[11] 4,138,085
[45] Feb. 6, 1979

[54] PRECISION BLOCKING OF LENS BLANKS

[76] Inventor: Bela J. Bicskei, 7 Hemenway Rd., Framingham, Mass. 01701

[21] Appl. No.: 763,191

[22] Filed: Jan. 31, 1977

Related U.S. Application Data

[63] Continuation-in-part of Ser. No. 657,455, Feb. 12, 1976, Pat. No. 4,077,722.

[51] Int. Cl.² ............... B22D 19/00; B23Q 17/00; B25B 1/24; G01B 9/00
[52] U.S. Cl. .................. 249/83; 33/174 A; 51/277; 269/13; 269/228; 356/127
[58] Field of Search ................. 425/808; 51/277; 269/71, 72, 73, 228, 307; 164/112; 33/28, 174 R, 174 A, 200; 249/83; 125/38, 35

[56] References Cited

U.S. PATENT DOCUMENTS

| | | | |
|---|---|---|---|
| 2,146,599 | 2/1939 | Smith | 33/174 A |
| 2,585,916 | 2/1952 | Coleman | 51/277 X |
| 2,643,557 | 6/1953 | Grove | 269/71 X |
| 2,755,553 | 7/1956 | Vaughn | 33/174 A |
| 3,289,311 | 12/1966 | Wolga | 33/174 R |
| 3,431,688 | 3/1969 | Rudd et al. | 164/112 X |
| 3,451,177 | 6/1969 | Buckminster | 51/277 |
| 3,589,079 | 6/1971 | Beasley | 51/277 |
| 3,807,095 | 4/1974 | Harding | 125/35 X |
| 3,872,760 | 3/1975 | Desnoyers | 269/228 X |

Primary Examiner—Francis S. Husar
Assistant Examiner—John S. Brown
Attorney, Agent, or Firm—George E. Kersey

[57] ABSTRACT

Method and apparatus for the precision blocking of lens blanks using a holder to de-center the blank and fix its optical axis. The holder is then used to position the blank with respect to a blocker by which an alloy hub or "block" is removably affixed to the blank so that it can be properly gripped for conversion into a finished lens product.

8 Claims, 7 Drawing Figures

PRECISION BLOCKING OF LENS BLANKS

BACKGROUND OF THE INVENTION

This is a continuation-in-part of Ser. No. 657,455 filed Feb. 12, 1976 and now U.S. Pat. No. 4,077,722. The invention relates to the blocking of lens blanks, and more particularly to the precision attachment of blocks to lens blanks for their conversion into finished lenses.

In the finishing of lens blanks for eye glasses, it is necessary to translate a prescription provided by an oculist or optometrist into lenses which are suitable and appropriate for mounting into a frame that meets the physical requirements of the user.

The prescription specifies the various powers of the users' lenses, and their optical axes, along with the user's pupilary distance (P.D.) and the measurements of the frame that has been selected. A pupilary distance is the measure of the separation between the pupils of the user. It is apparent that the pupilary distance varies from one user to another, and that it must be coordinated with the measurements of the selected frame.

In translating a lens prescription into a finished product, an optical technician begins by selecting a lens blank in accordance with the user's optical correction. In the general case where the lens has a toric, i.e. torodial, outer surface and a spherical inner surface, the lens has an optical center and prescribed optical axis in accordance with the required cylindrication of the lens. In the special case where the lens has only spherical surfaces, it has only an optical center.

The optical center and axis of a lens blank are located using an instrument known as a lensometer. The blank is positioned in the viewer of the lensometer and a reticle is focused on it. A typical lensometer reticle has a triplet of parallel lines and an onthogane bisecting line. When the bisecting line is focused on the lens blank, its spherical power is indicated by the focusing control. The lens blank is then centered horizontally.

In the next step, the triplet is focused on the lens and the focusing control provides an indication of the cylindrical power (which is given by the difference between the indicated value and the spherical reading). The lens blank is then centered vertically.

In the final step, the reticle is rotated until the bisector appears as a solid, unfragmented line. The amount of rotation indicates the inclination of the optical axis and the intersection of the bisector and the central line of the triplet gives the optical center.

The optical center and two points on the optical axis are then marked using an inking lever mechanism appended to the lensometer.

Once marked the lens blank is removed from the lensometer and a "cutting" line drawn on it through the three points to indicate the optical axis. In the next step a special scale is placed along the optical axis to locate the "finishing center". The latter is at the position by which the optical center is de-centered to accommodate the lens to the frame of the user. Thus if the P.D. is 68 millimeters and the frames have a bridge size, nose span, of 14 millimeters and a lens size of 48 millimeters making a total frame span of 62 millimeters, the optical center of each lens blank must be de-positioned by three millimeters (one-half of the difference between the frame span and the P.D.)

A temporary mounting known as a "block" is then temporarily affixed to the lens at the finishing center. The block is in the form of an alloy with a pattern that allows the lens blank to be rotated with respect to a finishing wheel.

It is apparent that if the optical axis is not properly located, or if the finishing center is not properly located, the finished lens will be in error.

In addition, the manual techniques in present use require operators with considerable skill, and are time consuming.

Even if the operator is highly skilled, he is confronted with play and inexactness in the instruments that he uses.

The result is that an estimated thirty percent of the lenses are incorrectly blocked, of which about fifteen percent are so inaccurate that they must be discarded. While the remaining fifteen percent are not rejected, they are nonetheless less accurate than they should be.

Accordingly, it is an object of the invention to increase the precision with which lens blanks can be blocked. A related object is to eliminate the need for the marking of lens blanks. Another related object is to eliminate the need for special scales in the de-centering of lens blanks.

Another object is to reduce the number of rejects encountered in the blocking of lenses. A related object is to raise the level of accuracy of lens blanks that are accepted.

A further object is achieve the precision blocking lenses with only semi-skilled operators.

SUMMARY OF THE INVENTION

In accomplishing the foregoing and related objects, the invention provides a holder by which a lens blank can be adjusted with precision relative to a lensometer and then to a blocker.

The holder has two degrees of translational motion and one degree of rotation. This permits accurate location of the optical center and axis of the blank. The holder can then be zeroed and the lens de-positioned in either or both of the translational directions to locate a finishing center for pupilary distance and bifocal adjustment. Alternatively the positioning and de-positioning of the lens in the holder can take place using a vernier mechanism.

The accuracy of the finishing center located using the holder is maintained by transferring the holder, with the blank, to a blocker. This eliminates the need for marking of the blanks, and the need for using auxiliary scales to de-center the blank. The blocking may take place by forming a block on the lens or by using a pre-formed block in conjunction with an adhesive mechanism.

As a result the required skill of the operator is significantly reduced and the quality of the final, finished product is considerably increased.

In accordance with one aspect of the invention, the holder is formed by frames which are nested within one another and slidable relative to one another.

In accordance with another aspect of the invention the holder has graduated scales for each degree of translation for controlled de-positioning of the lens blank.

In accordance with still another aspect of the invention, the holder can employ a micrometer mechanism to control positioning and de-positioning of the lens blank.

DESCRIPTION OF THE DRAWINGS

Other aspects of the invention will become apparent after considering several illustrative embodiments taken in conjunction with the drawings in which.

DETAILED DESCRIPTION

Figure 1A:
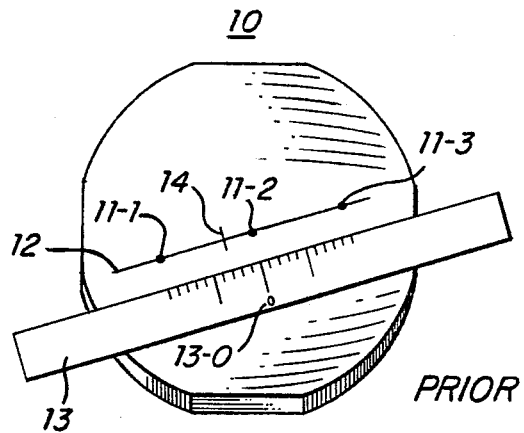
FIGS. 1A and 1B are diagrams of a lens blank being processed in accordance with the prior art.

Turning to the drawings FIG. 1A shows an illustrative lens blank 10 as it appears during the second state of blocking in accordance with the prior art.

During the first stage, the blank 10 was positioned on a lensometer (not shown) and marked (temporarily) with three dots, 11-1, 11-2 and 11-3. The central dot 11-2 is at the optical center of the blank 10, while the adjoining dots 11-1 and 11-3 are points on the cutting line.

After the dots 11-1, 11-2 and 11-3 are formed on the blank, it is removed from the lensometer and the optical axis 12 is drawn on the blank through the dots, using, for example, a felt tip pen. When this is done, the blank 10 is ready for de-centering in accordance with the prior art. This is accomplished by positioning a graduated scale 13 on the blank 10 along the axial line 12, with the origin 13-0 of the scale 13 at the optical center indicated by the dot 11-2. The blank is then de-centered according to the difference between the F.D. (frame distance) and the P.D. (pupilary distance). For the particular example of FIG. 1A the blank is de-centered by about 3 millimeters and the F.C. (frame center) indicated by the mark 14.

The scale is then removed and the blank 10 placed on a blocker (not shown), with the F.D. mark 14 overlying the corresponding indicator 15-2 on the blocker and the axis 12 overlying axial indicators 15-1 and 15-3 on the block. The blocker is then operated to form an alloy hub 16 that is centered on the F.D. mark 14.

Once the hub 16 is formed, it is used to secure the blank 10 in the grinding machine (not shown) by which the blank is ground into the desired finished product for the proper mounting in the frame (not shown) of the user.

The hub on block 16 is formed in standard fashion of alloy that tends to adhere to the glass surface or ordinary lens blanks. The adhesive is enhanced by lightly spraying the blank with a standard adhesive substance. Once the grinding operation is completed, the block 16 is removed, for example by lightly tapping the lens.

Figure 1B:
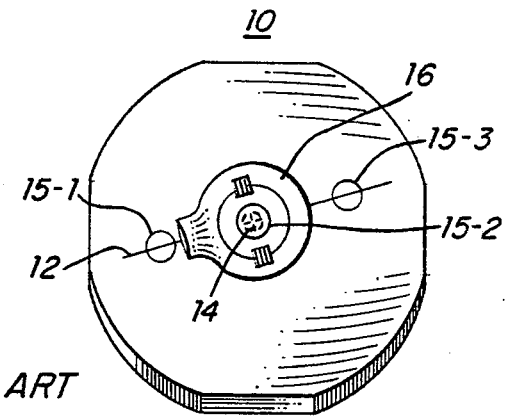

It is apparent that the prior art blocking as typified by FIG. 1A and 1B is slow, cumbersome and inaccurate.

Figure 2:
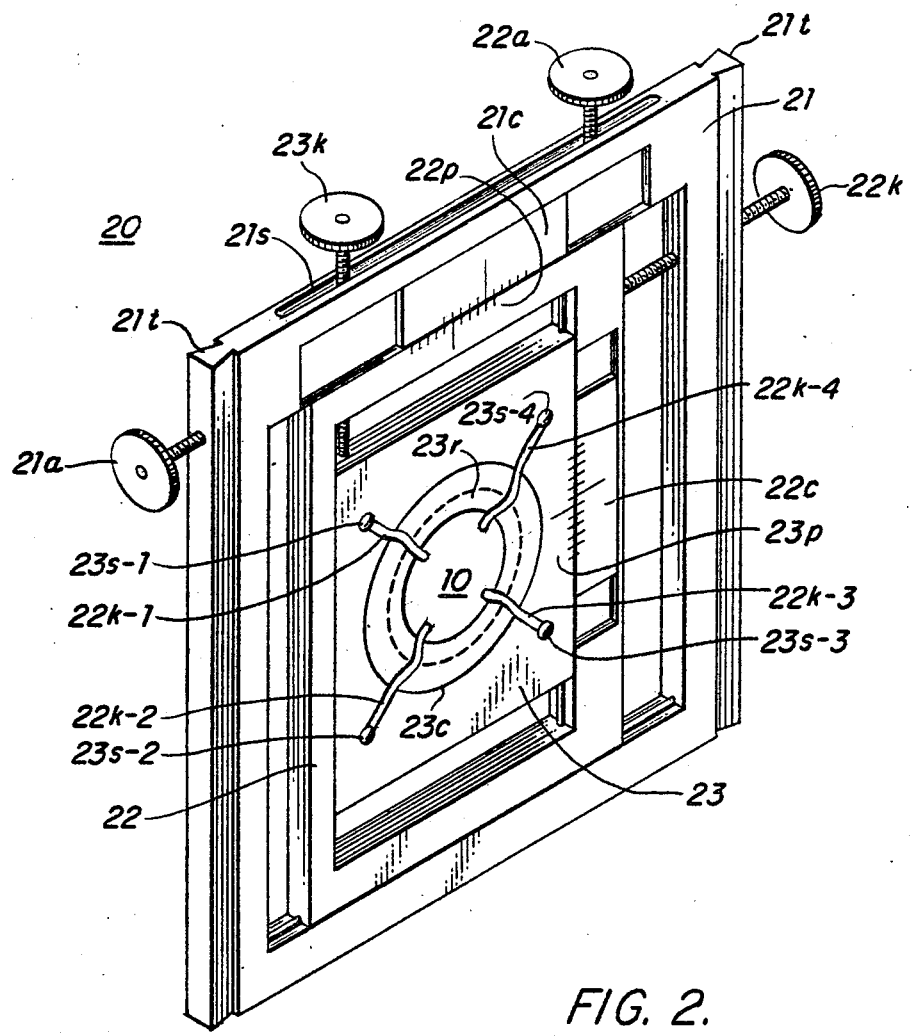
FIG. 2 is a perspective view of a holder in accordance with the invention.

The invention overcomes the difficulties of the prior art by using a holder 20 of the kind pictured in FIG. 2.

The holder 20 is formed by an outer frame 21, an intermediate frame 22 and an inner frame 23.

The inner frame 23 is movable vertically within the intermediate frame 22 by an adjusting knob 23k which is treaded through the intermediate frame 22 and extends through a slot 21s in the outer frame 21.

In addition the inner frame 23 has a central member 23c which is rotatable within the frame 23 and holds the lens blank 10. A retainer 23r, which can be a rubber ring, secures the blank 10 and provides an appropriate gripping surface for rotating the member 23c. After a suitable rotation has taken place, as explained below, the blank 10 is securely held in place by tightening set screws 23s-1 through 23s-4 associated with clamps 23k-1 through 23k-4.

The rotor member 23c is removable from the inner frame 23 and replacable with other rotor members to hold different sizes of lens blanks. In current practice the largest lens blanks have a maximum dimension of 75 millimeters and the smallest blanks have a maximum dimension of 58 millimeters.

The intermediate frame 22 is movable horizontally within the outer frame 21 by an adjusting knob 22k which is treaded through the outer frame 21.

The outer frame 21 includes an adjustable scale 21c which can be accurately positioned with respect to a scale 22p on the intermediate frame 22 by an adjusting knob 21a.

A similar adjustable scale 22c can be positioned with respect to a scale 23p on the inner frame 23, by an adjusting knob 22a which extends through the slot 21s in the outer frame 21.

To maintain the relative displacements of the frames 21 through 23 relative to one another, a dovetail groove and tongue can be used as shown. A dovetail tongue 21t is also provided at the vertical edges of the outer frame 21 for positioning the holder in a mount as explained below.

Figure 3:
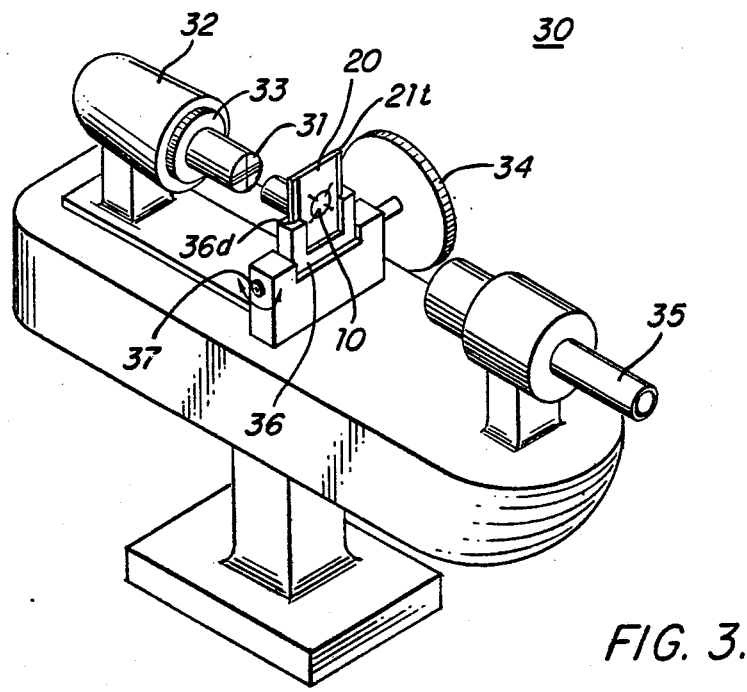
FIG. 3 is a perspective view of a lensometer with the holder of FIG. 2 in position.

In use, the holder 20 of FIG. 2 is inserted into a modified lensometer 30 of the kind illustrated in FIG. 3. The lensometer 30 has a standard reticle 31, a source of illumination 32 for the riticle and axial adjustment control 33, as well as a power adjustment control 34 and a view 35.

The lensometer 30 is modified by having a special mount 36 for the holder 20, with a dovetail slot 36d for the dovetail tongue 21t. In addition the mount is pivotable about an axis 37 to permit the lens blank 10 within the holder 20 to be seated against a reticle lens (not visible in FIG. 3), despite the fact that some of the lens blanks used in the holder 20 have appreciable curvature.

Once the lens blank 10 in the holder 20 is seated against the reticle lens of the lensometer 30, the control 34 is set with the spherical power of the lens blank. The adjusting knob 22k (FIG. 2) is manipulated until the verticle line of the reticle is in focus, so that it passes through the optical center of the lens blank.

The control 34 is next set with the cylindrical power of the lens blank and the adjusting knob 23k manipulated until the triplet of the reticle is in focus. The optical center of the lens blank is then at the intersection of the vertical line and the middle line of the triplet.

In the next step the control 33 is set with the optical axis and the central member 23c rotated until the vertical line from the reticle is unfragmented.

The set screws 23s-1 through 23s-4 are secured (to prevent any further, inadvertent rotation) and the scales 21c and 22c are zeroed. Zeroing takes place by operating adjusting knob 21a until the center line of scale 21c is opposite the center line of scale 22p. Similarly, adjusting knob 22a is operated until the center line of scale 22c is opposite the center line of scale 23p. Zeroing may take place with the holder in or out of the mount 36.

As a result of the foregoing operations the optical center of the lens blank 10 of precisely determined with respect to the holder 20. This is by contrast with the manual manipulation of the lens blank required in the prior art. It will be understood that the particular sequence of operations is merely illustrative, and other sequences may be employed as well.

In the first step of achieving precision blocking in accordance with the invention, the lens blank 10 in the holder 20 is de-positioned to the proper finishing center and the proper bifocal center.

If the lens blank 10 is not to be bifocal, it is only necessary to de-center the established optical center by moving the inner frame 23 from side to side using the knob 22k. Since the movable scale 21c is zeroed at this point with respect to the fixed scale 22p, the de-centering is accomplished by operating the knob 22k until the desired difference appears between the two scales 21c and 22p.

A similar de-positioning occurs between the zeroed scales 22c and 23p where a bifocal correction is to be made.

Figure 4:
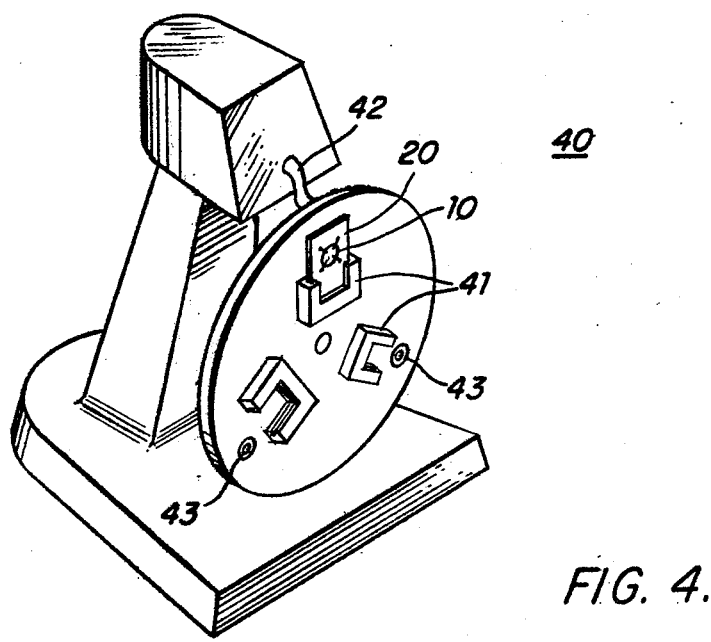
FIG. 4 is a perspective view of a blocker with the holder of FIG. 2 in position.

After the blank 10 is suitably de-positioned relative to the holder 20, it is inserted into a mount 41 of the modified blocker 40 shown in FIG. 4.

The mount 41 is similar to the mount 36 for the modified lensometer. Since the mount 41 assures that the lens blank 10 will be properly positioned, it is only necessary to operate the blocker in standard fashion, permitting molten alloy to flow along a feed tube 42 to a die position 43, where the desired block or hub is formed, similar to the block 16 of FIG. 1, except that it is formed with precision and without resort to the inaccurate manual techniques of the prior art.

Figure 5:
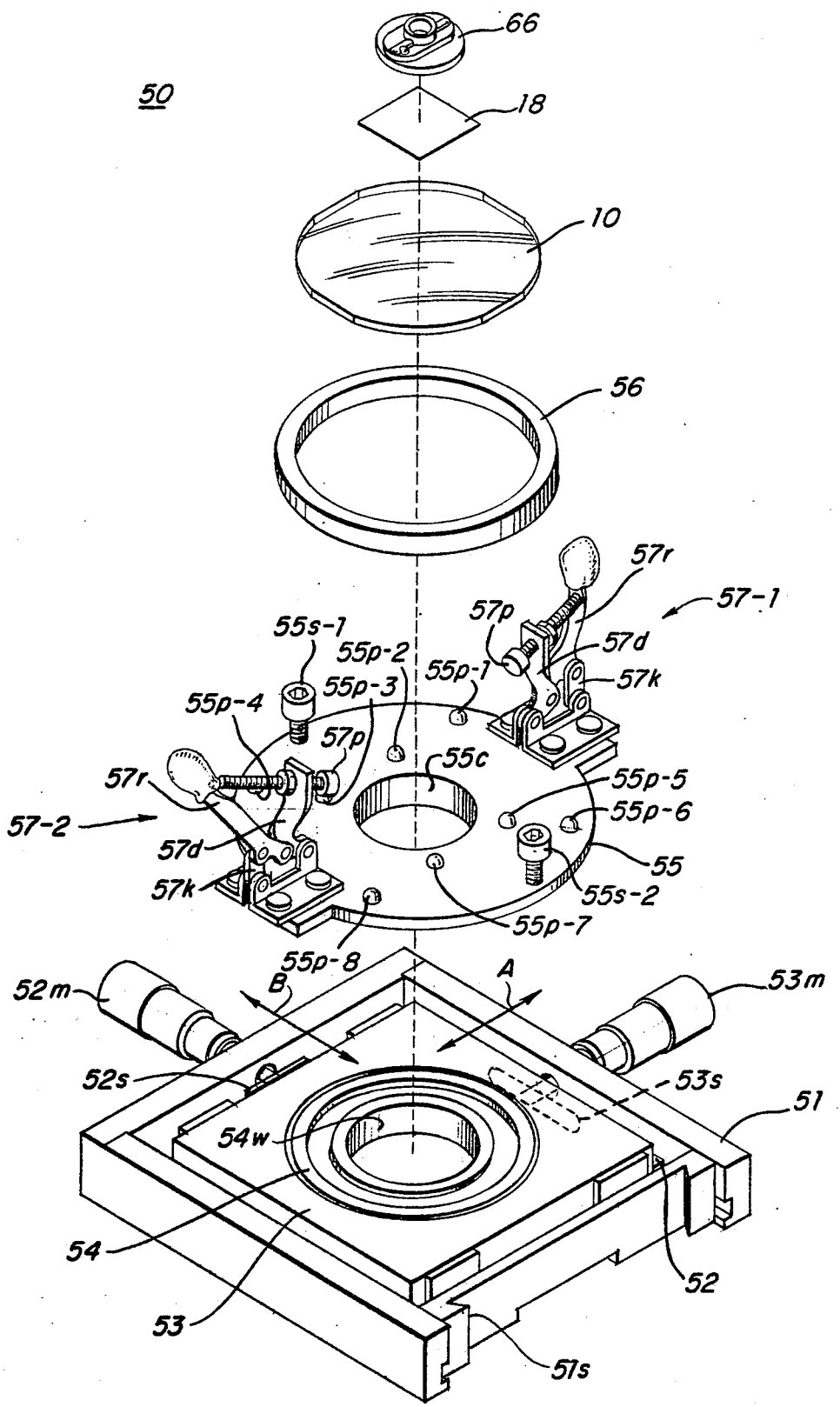
FIG. 5 is an exploded view of an alternative embodiment of a holder in accordance with the invention.

A further embodiment of the invention is the holder 50 depicted in exploded view in FIG. 5, formed by an outer frame 51, an intermediate member 52 and an inner member 53.

The inner member or table 53 is movable in the directions indicated by the double-headed arrow A by an adjusting mechanism 53m which passes through the outer frame 51 and is connected to the inner member 53.

In addition the inner member 53 has a central member 54 which is illustratively a ball bearing, that is adapted to receive a rotor plate 55 that is shown exploded from the table 53 in FIG. 5.

The intermediate member or platform 52 is movable in the direction indicated by the double-headed arrow B by an adjusting mechanism 52m which is inserted through the outer frame 51 and into an elongated slot 53s of the table 53. The mechanism 52m is then connected to permit movement of the platform 52 without affecting the table 53, for example by connection to a stud 52s mounted on the platform at edge of table.

In order to provide the proper relative motion of the platform 52 and the table 53 with respect to the outer frame 51, the platform 52 is mounted to move in one channel, for example grooves in the walls of the outer frame 51, while the table 53 is mounted to move in another channel, for example grooves in the platform or tabs positioned on the platform. The frame 51 of the mount 50 also includes a dovetail slot 51S by which the holder 50 may be mounted on auxialy equipment, for example, a lensometer or blocker.

The rotor plate 55 includes a collar 55c that is received by the inner walls 54w of the ball bearing 54. When the rotor is positioned on the bearing 54 with its collar 55c in engagement with the walls 54w, it is free to turn through 360° of rotation as long as set screws 55s-1 and 55s-2 are above the lower surface of the rotor 55. When the set screws 55s-1 and 55s-2 are threaded through the rotor to engage the exposed surface 53s of the table 53, the rotor element is fixed in rotational position. The set screws are advantageously of a plastic material which provides a relatively high coefficient of friction when its ends contact the surface 53s.

The rotor 55 also includes a set of protuberances 55p-1, 55p-2, 55p-3 and 55p-4 for fixing the position of a mounting ring 56 shown exploded from the rotor element 55 in FIG. 5. The mounting ring 56 can be of various sizes depending upon the size of the lens blank 10. When the mounting ring is in position on the rotor element 55 and includes the lens blank 10, the latter is held in position by clamps 57-1 and 57-2. Each of the clamps 57-1 and 57-2 is mounted on the rotor 55, and includes a mechanism for holding the blank in position. An illustrative mechanism is a toggle with a lever 57r pivotally connected to both a link 57k and a drive member 57d. Depression of the lever 57r causes the drive member to pivot in a counterclockwise direction towards the lens blank 10, bringing a pad 57p into clamping contact with it. It is advantageous for the pad 57p to be adjustable, for example, by the use of a screw threaded through the drive mechanism 57d and held in position by a suitable lock nut.

Figure 6:
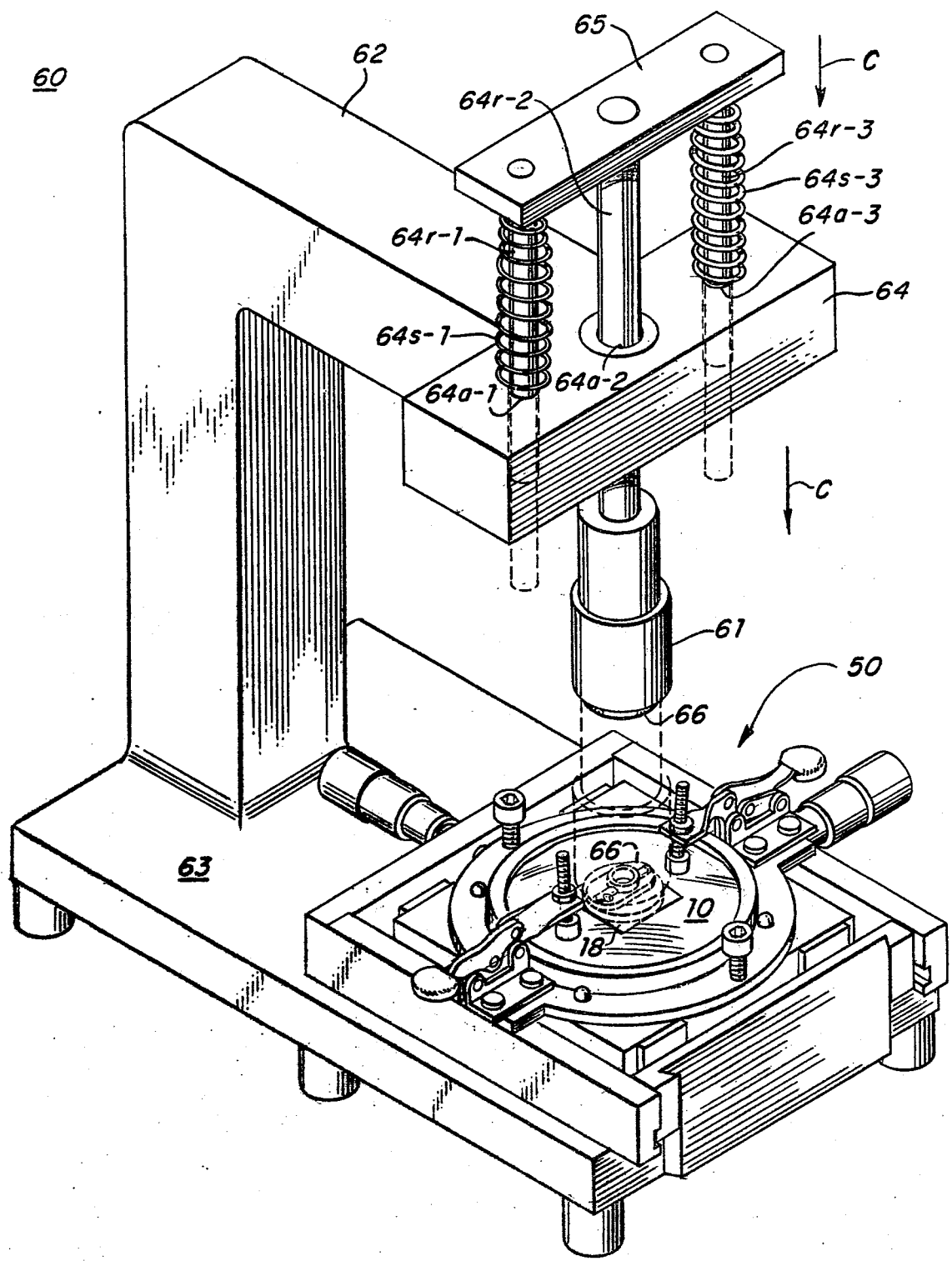
FIG. 6 is a perspective view of a blocker in accordance with the invention employing the holder of FIG. 5.

When the holder 50 is fully assembled with the lens blank 10 clamped in position, as illustrated, for example, in FIG. 6, it can be positioned on a lensometer or a blocker.

When the holder is positioned on auxiliary equipment, the lens blank 10 is properly positioned using the adjusting members 52m and 53m, which in FIG. 5 are micrometers. The setting of each of the micrometers 52m and 53m is noted for the proper positioning of the blank. The blank can then be de-positioned as desired by further manipulation of one or both of the micrometers 52m and 53m according to the de-positioning that is required.

Turning to FIG. 6, the holder 50 is shown there after the blank 10 has been correctly positioned and depositioned using one or both of the micrometers 52m and 53m. Consequently the lens blank 10 is in condition to recieve a block to permit further processing, such as gringing. By contrast with the blocker 40 of FIG. 4 which uses a melt and a mold to form a suitable block on the lens 10 while positioned in the mount 20, the blocker 60 of FIG. 6 is adapted to use pre-formed blocks, such as the illustrative block 66 shown temporarily held in a suitable recess of a cylindrical carrier 61.

The blocker 60 is formed by an elbow support 62 that has one end attached to a platform 63 and another end attached to a cross piece 64. The cross piece 64 includes cylindrical apertures 64a-1, 64a-2 and 64a-3 into which cylindrical rods 64r-1, 64r-2 and 64r-3 are inserted. A central rod 64r-2 extends through the cylindrical aperture 64a-2 to the carrier 61 and is attached at its other end to a plunger 65. The other two rods 64r-1 and 64r-3 are also attached to the plunger 65 and inserted into respective apertures 64a-1 and 64a-3. In addition, the rods 64r-1 and 64r-3 are loaded by spring members 64s-1 and 64s-3, so that when the plunger 65 is depressed in the direction indicated by the arrow C, the springs 64s-1 and 64s-3 are compressed and the carrier 61 holding the pre-formed block 66 moves towards the lens 10. When downward pressure on the plunger 65 is released, the compressed springs 64s-1 and 64s-3 return the plunger 65 to its original position.

In order to attach the pre-formed block 66 to the lens biank 10, a double-faced adhesive strip 18 is placed on the lens blank 10. One adhesive surface thus adheres the strip 18 to the face of the lens blank 10 while the other adhesive surface faces the pre-formed block 66. Consequently when the plunger 65 is depressed the block 66 comes into engagement with the exposed adhesive surface of the strip 18 and becomes adhered to the lens blank 10. Accordingly, when the plunger is released, the block 66 becomes withdrawn from the aperture of the carrier 61.

By contrast with the prior art which does not employ a holder such as the holder 20 or 50, and requires specially configured strips when pre-formed blocks are to be mounted on a lens blank, the strip 18 does not require a special configuration, thus significantly reducing the cost of correctly attaching preformed mounts to lens blanks.

While various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

I claim:

1. Apparatus for the precision manipulating of lens blanks comprising a frame;

means on said frame for mounting the lens blank within said frame;

means effecting translational movement of the mounting means relative to said frame;

means mounting said frame on auxiliary equipment including means moveable towards said frame for bringing a preformed block into contact with an adhesive strip positioned on said lens blank positioned at a prescribed translational position relative to said frame.

2. Apparatus as defined in claim 13 further including means for translationally moving said lens blank relative to said frame with two independent degrees of motion.

3. Apparatus as defined in claim 1 wherein the translational means is micrometer movable.

4. Apparatus as defined in claim 1 further including means for establishing a reference for the movement of the translational means relative to said frame.

5. Apparatus as defined in claim 1 wherein the mounting means includes toggle means for clamping said lens blank in position thereon.

6. Apparatus as defined in claim 1 further including means for the mounting thereof on auxiliary equipment.

7. Apparatus as defined in claim 6 wherein said auxiliary equipment is a blocker.

8. Apparatus as defined in claim 7 wherein said blocker includes a die position and means connectable at said die position for applying a melt to said lens blank to form a block which on said lens blank.

* * * * *